Patented Jan. 30, 1945

2,368,154

UNITED STATES PATENT OFFICE 2,368,154

TREATMENT OF ARTIFICIAL MATERIALS

Robert Wighton Moncrieff and Harold Bates, Spondon, near Derby, England, assignors to Celanese Corporation of America, a corporation of Delaware No Drawing. Application December 10, 1940, Serial No. 369,404. In Great Britain January 11, 1940

7 Claims. (Cl. 8—132)

This invention relates to the treatment of artificial materials, and particularly to the treatment of filamentary materials having a basis of an organic derivative of cellulose which have been stretched in a hot aqueous medium.

In British Patents Nos. 438,584, 438,585, 438,586, 438,587, 438,655 and 438,656 there are described methods by which cellulose derivative filamentary materials may be stretched in hot aqueous media, e. g., hot water or wet steam. Such treatments are generally found to reduce the extensibility of the materials, and processes have been described for restoring extensibility to the products, particularly treatments with shrinking agents, especially latent solvents according to the process of U. S. Patent No. 2,058,422. It has hitherto been supposed that a shrinkage of at least about 10% is necessary to restore extensibility to an extent of practical utility, preferably about 10–20%. We have now found, however, that by treating cellulose derivative filamentary materials which have been stretched in hot water or wet steam with dilute aqueous solutions of swelling agents for the cellulose derivative so that substantially no shrinkage occurs, there may be produced a good increase of extensibility with no substantial loss of tenacity. Products of the treatment are also found to possess an unusually high degree of resistance to wear and to creasing.

The swelling agents which may be employed according to the invention may be latent solvents or non-solvent swelling agents, e. g. ethylene glycol and ethyl alcohol, but, when treating materials having a basis of cellulose derivatives which are soluble in organic solvents, it is preferable to employ true solvents.

Examples of such true solvents are dioxane, acetone, formic acid, acetic acid, propionic acid, the monomethyl ether of ethylene glycol, and methyl ethyl ketone. If desired, two or more swelling agents may be employed in admixture in dilute aqueous solution to serve as the treatment medium.

The concentration and temperature of the treatment medium are to a large extent interrelated, having regard to the critical feature that substantially no shrinkage may take place, and they will depend upon the nature of the filamentary materials to be treated, and the extent to which they have been stretched before treatment. Suitable treatment media for use with yarns of acetone-soluble cellulose acetate which have been stretched in wet steam to 1000% of their original length are, for example, 7–25% dioxane, 5–15% acetic acid and 5–30% acetone, all at 25° C., and 1–25% acetone at 40–50° C. (all percentages by volume). It is generally undesirable to employ temperatures in excess of 50–60° C.

With a view to reducing the tendency to shrink the materials which the dilute aqueous solutions may possess, there may be added to them a proportion of a salt, e. g., sodium acetate or sodium chloride. For example, a proportion of 1–5 or even up to 10% of sodium acetate may be incorporated in a dilute aqueous solution of acetic acid, and the resulting liquor employed as the treatment agent according to the invention. Such an agent is found to produce an increase in extensibility comparable with that produced by a similar agent without the sodium acetate, to give a slightly improved tenacity and to have a reduced tendency to shrink the materials.

While it is preferable to employ media which do not shrink the materials at all, substantial improvements in physical characteristics may be produced with media which produce a shrinkage up to 2% or even 4, 5 or 6%, e. g., a medium of 35–38 or 40% acetone at about 35° C. The time of treatment does not greatly affect the results, provided that the medium is allowed to remain in contact with the materials for a period of at least about 5 minutes. Preferably the treatment is continued for 15 or 30 minutes at least and it may last for a time up to 2 or more hours if desired.

It is important to ensure that the filamentary materials are substantially uniformly treated throughout their cross-section. This can be achieved more particularly by strictly observing a minimum for the time during which any particular medium is allowed to remain in contact with the materials. This minimum may readily be determined for any given set of conditions by noting the time at which change in extensibility substantially ceases.

The present invention may, with advantage, be applied to any cellulose derivative filamentary materials which have been stretched in a hot aqueous medium, for example, to 200, 500, 1000 or 2000% or more of their original length. While cellulose acetate is the preferred cellulose derivative, materials having a basis of other cellulose derivatives may be treated, for example, materials having a basis of cellulose propionate, cellulose butyrate, cellulose aceto-propionate, cellulose aceto-butyrate, ethyl cellulose, propyl cellulose, oxyethyl cellulose and oxyethyl cellulose acetate, mixtures of cellulose derivatives with each other or with other filament-forming materials, e. g., the linear superpolymers formed, for example, by self-condensation of amino-carboxylic or amino-sulphonic acids or by condensation of diamines with dicarboxylic or disulphonic acids, and vinyl polymers. The invention may also advantageously be applied to cellulose derivative filamentary materials which, after stretching as described above, have been subjected to an esterifying operation, especially an operation to introduce the radicle of a dicarboxylic acid, e. g., the adipyl or phthalyl radicle, as described in British Patent No. 489,436 and U. S. applications S. Nos. 306,704, filed November 29, 1939, now Patent No. 2,301,263, and 344,460, filed July 8, 1940. When treating such esterified materials, somewhat more concentrated solutions of swelling agents and/or higher temperatures may be employed than in the case of materials which have not been subjected to an esterifying operation. The treatment media according to the invention may be applied to the materials, e. g. filaments, twisted or untwisted yarns and the like, in any desired manner as, for example, by a bath treatment or by spraying or padding methods. For treatment, the materials may be loose, in the form of hanks, on bobbins or swifts, in the form of cakes produced by means of a centrifugal box, or in any other package form. The media may be applied to travelling materials, e. g., to yarns travelling from the stretching apparatus to a bobbin or other winding device, and removed therefrom after an appropriate time has elapsed. According to a particularly valuable method of applying the media to travelling materials, the materials are led round a rotating roller which is sprayed with the medium or in contact with the upper surface of a rotating roller which dips into a bath of the medium so that, in effect, the materials are contacted with a continuously renewed thin film of the medium without being immersed in a bath.

After treatment according to the invention the cellulose derivative materials may be subjected to further operations with a view to modifying their characteristics. In particular, cellulose ester materials may be saponified to an appropriate extent, either wholly or partially, or homogeneously or superficially. For example, the materials may be subjected to the action of dilute caustic soda solutions, e. g., of concentration 1% or less, the action of which may be moderated and/or rendered more uniform by the presence of salts such as, for example, sodium acetate. There may thus be obtained yarns of higher tenacity and extensibility having a dyestuff affinity comparable with that of cotton where saponification has taken place to a greater degree or an affinity for cellulose derivative dyestuffs where saponification has been carried out to a relatively low degree.

The following examples illustrate the invention:

*Example 1*

Hanks of low twist yarn, composed of dry-spun cellulose acetate filaments which have been stretched to 10 times their original length in wet steam to increase their tenacity, are immersed in a bath of 15% aqueous acetone (percentage by volume) at 25° C. for one hour. The hanks are then removed from the bath, washed with water and dried. The yarn is found to possess a substantially increased extensibility and wear- and crease-resistance, while its tenacity is substantially maintained.

*Example 2*

Hanks of low twist yarn, composed of dry-spun cellulose acetate filaments which have been stretched to 10 times their original length in wet steam and then subjected to an adipylating operation according to the method of Example 1 of U. S. application S. No. 344,460 are immersed in a bath of 35% aqueous acetone (percentage by volume) at 25° C. for two hours. The hanks are then removed from the bath, washed with water and dried. The extensibility of the yarn is thus substantially increased with no or no substantial loss of tenacity.

Although in both the preceding examples low twist yarn of dry-spun cellulose acetate filaments is employed, it will be understood that analogous results may be produced by similar treatments of yarn having a higher twist or of dumb yarn, and of yarns of wet-spun as well as dry-spun cellulose acetate filaments. The degree of stretch does not affect the qualitative results, but only the degree of modification which is induced by the treatment.

Having described our invention, what we desire to secure by Letters Patent is:

1. A process for the improvement of the extensibility of artificial textile materials, which comprises subjecting filamentary materials which have a basis of an organic derivative of cellulose, and which have been stretched in hot water or steam, to the action of a medium comprising an aqueous solution of a swelling agent for the cellulose derivative containing 1 to 30% of the swelling agent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

2. A process for the improvement of the extensibility of artificial textile materials, which comprises subjecting filamentary materials which have a basis of an organic derivative of cellulose, and which have been stretched in hot water or steam, to the action of a medium comprising an aqueous solution of a true solvent for the cellulose derivative containing 1 to 30% of the solvent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

3. A process for the improvement of the extensibility of artificial textile materials, which comprises subjecting filamentary materials which have a basis of an organic derivative of cellulose, and which have been stretched in hot water or steam and which thereafter have been subjected to an esterifying operation, to the action of a medium comprising an aqueous solution of a swelling agent for the cellulose derivative containing 1 to 30% of the swelling agent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

4. A process for the improvement of the extensibility of artificial textile materials, which comprises subjecting filamentary materials which have a basis of an organic derivative of cellulose, and which have been stretched in hot water or steam and which thereafter have been subjected to an esterifying operation, to the action of a medium comprising an aqueous solution of a true solvent for the cellulose derivative containing 1 to 30% of the solvent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

5. A process for the improvement of the extensibility of artificial textile materials, which comprises subjecting filamentary materials which have a basis of cellulose acetate, and which have been stretched in hot water or steam, to the action of a medium comprising an aqueous solution of a swelling agent for the cellulose acetate containing 1 to 30% of the swelling agent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

6. A process for the improvement of the extensibility of artificial textile materials, which comprises subjecting filamentary materials which have a basis of cellulose acetate, and which have been stretched in hot water or steam and which thereafter have been subjected to an esterifying operation, to the action of a medium comprising an aqueous solution of a swelling agent for the cellulose acetate containing 1 to 30% of the swelling agent by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

7. A process for the improvement of the extensibility of artificial textile materials, which comprises subjecting filamentary materials which have a basis of cellulose acetate, and which have been stretched in hot water or steam, to the action of a medium comprising an aqueous solution of acetone containing 5 to 30% of acetone by volume, which medium at the temperature of the treatment has no tendency to shrink the materials, the time of contact of the filamentary materials with the medium being at least 5 minutes to ensure substantially uniform treatment of the filaments throughout their cross-section, and the temperature of treatment being at most 60° C., and washing and drying said treated filamentary materials.

ROBERT WIGHTON MONCRIEFF.
HAROLD BATES.